Patented Sept. 26, 1922.　　　　　　　　　　　　　　1,430,277

UNITED STATES PATENT OFFICE.

FREDERICK WILLIAM ATACK, OF MANCHESTER, ENGLAND, AND JOHN ANDERSON, OF ST. ANDREWS, SCOTLAND, ASSIGNORS TO THE BRITISH ALIZARINE COMPANY LIMITED, OF MANCHESTER, LANCASTER, ENGLAND.

FUSION OF ORGANIC SUBSTANCES WITH ALKALIES.

No Drawing.　　　Application filed February 18, 1921.　Serial No. 446,151.

*To all whom it may concern:*

Be it known that we, FREDERICK WILLIAM ATACK and JOHN ANDERSON, both subjects of the King of Great Britain, residing in Manchester, Lancashire, England, and St. Andrews, Fifeshire, Scotland, respectively, have invented certain new and useful Improvements in and Relating to the Fusion of Organic Substances with Alkalies, of which the following is a specification.

This invention relates to improvements in the alkali fusion of organic substances particularly aromatic substances containing less than four benzene nuclei, including for instance, anthraquinone and excluding benzanthrone. The invention consists primarily in adding an inert non-hydroxylic diluent to the caustic soda used in such fusions; or in adding such a diluent to caustic potash fusions (or caustic soda fusions) in the anthraquinone series; or in performing alkali fusions of organic bodies in general in presence of a very high-boiling oil such as liquid paraffin or the like.

It is the object of the invention to improve the efficiency of the fusion process, and in different cases this may be done in various ways, particularly by increasing the yield of the desired product or decreasing the quantity of undesirable by-products. It is a further object of the invention to provide processes whereby caustic soda can be used effectively instead of caustic potash for fusions of bodies in the anthraquinone series.

The invention will be described mainly with reference to bodies in the anthraquinone series but it is not limited thereto; it is applicable with particular advantage in the alkali fusion of aromatic sulpho bodies.

The word fusion is to be understood as referring to operations in which an organic body is raised to a high temperature in presence of alkali and a diluent, whether actual melting of the alkali occurs or not; thus the same term will be employed for convenience to include cases in which the alkali and (or) the organic body dissolves in the diluent, or cases in which suspension occurs instead of solution.

We use a non-hydroxylic diluent or solvent at a fairly high temperature, e. g. 180° C. and upwards is suitable. It is preferable to use a high-boiling solvent such as aniline, naphthalene or other hydrocarbons such as liquid paraffin (paraffinum liquidum), and to perform the reaction at or near the boiling point if this is not too high. The reaction may be performed with or without the addition of an oxidizing agent with results as hereafter described. Although it is obviously convenient to employ a high-boiling solvent, the invention also includes cases in which a relatively low-boiling solvent such as toluene is employed under pressure. Hydroxylic solvents are not found suitable.

We will now illustrate the invention by describing examples which in view of possible variations in detail are merely illustrative.

Example 1.

Take a mixture of 10 grammes of 2-amino-anthraquinone, 100 cc. of aniline, and 20 grammes of powdered caustic potash. This mixture is heated for a short time to remove excess moisture present in the reagents, and then boiled for 6 hours under a reflux condenser. The solid material is filtered off at a temperature of 90° C. and the aniline is then removed from this solid material by treatment with dilute hydrochloric acid. The residue is then extracted with dilute caustic soda and washed with water, giving a product which is not pure anthraquinone - $1.2.2^1.1^1$-$NN^1$-dihydroazine; it dyes cotton green from hydrosulphite vat. An alkali soluble product can be recovered by acidification of the alkaline washings.

Example 2.

This example illustrates the use of another solvent and also of an oxidizing agent, (potassium nitrate is mentioned merely by way of an example). Take 10 grammes of 2-aminoanthraquinone, 114.5 grammes of naphthalene, 20 grammes of powdered caustic potash and 2 grammes of powdered potassium nitrate. After heating for a short time to remove moisture, the mixture is boiled for 3 hours under a reflux condenser or until no material remains in solution. It is then steam distilled after acidification in order to prevent frothing. The steam distillation removes the naphthalene and the remaining aqueous suspension is filtered and the residue washed with dilute caustic soda as in the first example.

The product so obtained, which is anthraquinone-1.2.2¹.1¹-NN¹-dihydroazine (indanthrene) dyes cotton a pure blue from hydrosulphite vat.

A better result is obtained than in the first example because of the higher boiling point of the diluent. About 250° C. or higher appears to be the best temeperature, but the temperature must obviously not be high enough to cause destruction of the desired products.

*Example 3.*

10 grammes 2.aminoanthraquinone were stirred up with 100 ccs. liquid paraffin at a temperature of 250° C.

At this temperature were added 2 grammes sodium nitrate and 20 grammes crushed sodium hydroxide.

The mixture was then stirred for 1 hour at 260° C. to 270° C. After cooling, the resultant suspension was filtered, the residue being washed with petroleum ether to remove the adhering oil. Excess of caustic soda was eliminated by boiling with water, again filtering and washing the residue on the filter with hot water.

The product dyed cotton a bright blue in a hydrosulphite vat. Atmospheric oxidation converted this to a blue-green dyeing.

*Example 4.*

The fusion of sodium salt of anthraquinone.2.sulphonic acid with sodium hydroxide in paraffin suspension.

A mixture of 10 grammes sodium salt as above and 100 ccs. liquid paraffin was brought to a temperature of 200° C. in an iron crucible.

2.5 grammes sodium nitrate and 20 grammes crushed sodium hydroxide were then added and the suspension was stirred at a temperature of 260° to 270° C. for 1 hour. In the presence of the sodium salt the caustic soda assumed a thin pasty consistency at 250° C. and the mixture stirred easily at 260° C. to 270° C.

At the end of the reaction the oil suspension was cooled and filtered, excess of the high boiling oil being removed by washing with petroleum ether. The solid residue was boiled up with water, the solution filtered and acidified with sulphuric acid when a precipitate was obtained mainly consisting of alizarin.

With reference to the last 2 examples, it may be added that hitherto remarkable differences have been observed between the behaviour of caustic potash and caustic soda in certain fusions, e. g. that of 2.amino-anthraquinone. A study of the behaviour of these bodies indicates that good results can be obtained with caustic soda, if diluents are used at a sufficiently high temperature, e. g. in the neighbourhood of 250° C. or above.

We may add that we do not claim the fusion of benzanthrone with caustic potash in presence of solvents, and we do not regard benzanthrone as containing the anthraquinone nucleus. We do not claim the fusion of organic bodies with alkalies in presence of hydroxylic solvents of low or high boiling point.

We declare that what we claim is:—

1. The process which comprises fusing an aromatic body containing less than four benzene nuclei with caustic alkali in presence of an inert diluent.

2. The process which comprises fusing an aromatic organic body with caustic soda in presence of an inert diluent.

3. The process which comprises fusing an aromatic body containing less than four benzene nuclei with caustic alkali in presence of an inert non-hydroxylic diluent.

4. The process which comprises fusing an aromatic organic body with caustic soda in presence of an inert non-hydroxylic diluent.

5. The process which comprises fusing an organic body containing an anthraquinone nucleus with caustic alkali in presence of an inert non-hydroxylic diluent.

6. The process which comprises fusing an organic body containing an anthraquinone nucleus with caustic soda in presence of an inert non-hydroxylic diluent.

7. The process which comprises fusing an organic body containing an anthraquinone nucleus with caustic alkali in presence of an inert non-hydroxylic diluent and an oxidizing agent.

8. The process which comprises fusing an aromatic body containing less than four benzene nuclei with caustic alkali in presence of a high-boiling inert oil.

9. The process which comprises fusing an aromatic organic body with caustic soda in presence of a high boiling inert oil.

10. The process which comprises fusing an organic body containing an anthraquinone nucleus with caustic alkali in presence of a high boiling inert oil.

11. The process of fusing an aromatic organic body with caustic alkali in presence of a hydrocarbon as diluent.

12. The process of fusing an aromatic organic body with caustic soda in presence of a hydrocarbon as diluent.

13. The process of fusing an organic body having an anthraquinone nucleus with caustic alkali in presence of a hydrocarbon as diluent.

14. The process of fusing an aromatic organic body with caustic alkali in presence of paraffinum liquidum as diluent.

15. The process of fusing an aromatic organic body with caustic soda in presence of paraffinum liquidum as diluent.

16. The process of fusing an organic body having an anthraquinone nucleus with caustic alkali in presence of paraffinum liquidum as diluent.

17. The process of treating an organic body having an anthraquinone nucleus which comprises heating it to not less than about 250° C. with caustic soda in presence of an inert non-hydroxylic diluent.

In witness whereof, we have hereunto signed our names this 3rd day of February, 1921, in the presence of two subscribing witnesses.

FREDERICK WILLIAM ATACK.
JOHN ANDERSON.

Witnesses:
RICHARD T. WOOD,
GEORGE WEAVER.